(12) United States Patent
Bordwell et al.

(10) Patent No.: US 11,200,762 B2
(45) Date of Patent: Dec. 14, 2021

(54) OPERATIONAL MONITORING AND CONTROL SYSTEM FOR A POWER TAKE OFF

(71) Applicant: Parker-Hannifin Corporation, Cleveland, OH (US)

(72) Inventors: Mark A. Bordwell, Olive Branch, MS (US); Jeffrey Dale King, Olive Branch, MS (US); Walter Harris, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 149 days.

(21) Appl. No.: 16/070,412

(22) PCT Filed: Jan. 19, 2017

(86) PCT No.: PCT/US2017/014026
§ 371 (c)(1),
(2) Date: Jul. 16, 2018

(87) PCT Pub. No.: WO2017/127479
PCT Pub. Date: Jul. 27, 2017

(65) Prior Publication Data
US 2019/0019359 A1    Jan. 17, 2019

Related U.S. Application Data

(60) Provisional application No. 62/385,972, filed on Sep. 10, 2016, provisional application No. 62/286,391, filed on Jan. 24, 2016.

(51) Int. Cl.
*G07C 5/08* (2006.01)
*B60K 17/28* (2006.01)
*B60K 17/02* (2006.01)

(52) U.S. Cl.
CPC ............ *G07C 5/0825* (2013.01); *B60K 17/02* (2013.01); *B60K 17/28* (2013.01); *G07C 5/0808* (2013.01);
(Continued)

(58) Field of Classification Search
CPC .. G07C 5/0825; G07C 5/0808; G07C 5/0833; B60K 17/02; B60K 17/28; B60Y 2300/423; B60Y 2306/15
(Continued)

(56) References Cited

U.S. PATENT DOCUMENTS 4,597,301 A    7/1986   Weis et al.
4,722,426 A    2/1988   Bellanger
(Continued)

FOREIGN PATENT DOCUMENTS

CN    204080721 U    1/2015
JP    2013066700 A   4/2013

OTHER PUBLICATIONS

PCT International Search Report and the Written Opinion, Application No. PCT/US2017/014026, dated Apr. 24, 2017.
(Continued)

*Primary Examiner* — Krishnan Ramesh
(74) *Attorney, Agent, or Firm* — MacMillan, Sobanski & Todd, LLC

(57) ABSTRACT

A combined power take off and controller includes a power take off including a housing that is adapted to be supported on a housing of a source of rotational energy, an input mechanism that extends through an opening provided in the housing and is adapted to be rotatably driven by the source of rotational energy whenever the source of rotational energy is operated, and an output mechanism that is rotatably driven by the input mechanism and that is adapted to be connected to a rotatably driven accessory. The controller is
(Continued)

responsive to one or more operating conditions of the power take off for monitoring and/or controlling the operation thereof.

10 Claims, 3 Drawing Sheets

(52) U.S. Cl.
CPC ...... G07C 5/0833 (2013.01); *B60Y 2300/423* (2013.01); *B60Y 2306/15* (2013.01)

(58) Field of Classification Search
USPC ..................................................... 701/34.4
See application file for complete search history.

(56) References Cited

U.S. PATENT DOCUMENTS

| | | | |
|---|---|---|---|
| 4,760,902 A | 8/1988 | Bellanger | |
| 5,904,126 A * | 5/1999 | McKay | ................ F04B 17/042 123/196 S |
| 6,129,187 A | 10/2000 | Bellanger et al. | |
| 7,101,312 B2 | 9/2006 | Bauerle et al. | |
| 7,807,731 B1 * | 10/2010 | Bilski | ...................... C08K 5/01 523/124 |
| 7,832,223 B2 | 11/2010 | Arshad et al. | |
| 8,269,360 B2 | 9/2012 | Boisvert et al. | |
| 2003/0200015 A1 | 10/2003 | Pillar | |
| 2004/0209718 A1 * | 10/2004 | Ishibashi | ........... B60W 30/1888 474/18 |
| 2005/0217398 A1 * | 10/2005 | Hou | ...................... F16D 48/066 74/11 |
| 2011/0024255 A1 * | 2/2011 | Gomm | .................. B60K 6/387 192/84.1 |
| 2015/0362058 A1 | 12/2015 | McPherson et al. | |
| 2017/0197625 A1 * | 7/2017 | Omran | .................... B60K 17/28 |
| 2017/0198769 A1 * | 7/2017 | Vora | ...................... B60K 25/02 |

OTHER PUBLICATIONS

European Search Report, Application No. 17741878.7, dated Aug. 20, 2019.

* cited by examiner

OPERATIONAL MONITORING AND CONTROL SYSTEM FOR A POWER TAKE OFF

CROSS REFERENCE TO RELATED APPLICATIONS

This application claims the benefit of U.S. Provisional Application No. 62/286,391 filed Jan. 24, 2016 and of U.S. Provisional Application No. 62/385,973 filed Sep. 10, 2016, the disclosures of which are both incorporated herein by reference.

BACKGROUND OF THE INVENTION

This invention relates in general to a power take off for transferring rotational energy from a source of rotational energy to a driven accessory. In particular, this invention relates to a configurable operational monitoring and control system for a power take off that not only controls the operation and functions of the power take off, but also utilizes inputs from a variety of sources to monitor the operational status of the power take off in real time.

A power take off is a well known mechanical device that is often used in conjunction with a source of rotational energy, such as a vehicle engine or transmission, to transfer rotational energy to a driven accessory, such as a hydraulic pump that is supported on the vehicle. For example, power take offs are commonly used on industrial and agricultural vehicles to transfer rotational energy from the vehicle engine to one or more hydraulic pumps that, in turn, are used to operate hydraulically driven accessories such as plows, trash compactors, lifting mechanisms, winches, and the like. The power take off provides a simple, inexpensive, and convenient means for transferring energy from the source of rotational energy to the hydraulic pump that, in turn, transfers relatively high pressure fluid to operate the driven accessory.

A typical power take off includes a housing, an input mechanism, and an output mechanism. The power take off housing is adapted to be supported on a housing of the source of rotational energy and includes an opening that is aligned with an opening provided in the power take off housing. The input mechanism of the power take off extends outwardly from the power take off housing through the aligned openings and into the housing of the source of rotational energy. In this manner, the input mechanism of the power take off is connected to the source of rotational energy so as to be rotatably driven whenever the source of rotational energy is operated. The output mechanism of the power take off is rotatably driven by the input mechanism and is adapted to be connected to the rotatably driven accessory. In some instances, the input mechanism of the power take off is directly connected to the output mechanism such that the driven accessory is rotatably driven whenever the source of rotational energy is operated. In other instances, a clutch assembly is provided between the input mechanism and the output mechanism such that the driven accessory is rotatably driven only when the clutch assembly is engaged while the source of rotational energy is operated.

It is known to provide an electronic over-speed controller for use with a power take off in order to prevent the power take off from being operated at excessive speeds. For example, a known electronic over-speed controller is capable of not only turning the power take off on and off, but also automatically disengaging the clutch assembly of the power take off if the speed thereof exceeds a predetermined maximum value. The speed of the power take off can be measured by a magnetic pickup sensor that is located adjacent to the input gear and that generates a series of magnetic pulses as the teeth of the input gear rotate thereby. Light emitting diodes or other conventional alarms may also be activated when the speed of the power take off exceeds a predetermined threshold so as to provide an error warning to an operator. However, it would be desirable to provide additional monitoring and control capabilities for a power take off.

SUMMARY OF THE INVENTION

This invention relates to a configurable operational monitoring system for a power take off that not only controls the operation and functions of the power take off, but also utilizes inputs from a variety of sources to monitor the operational status of the power take off in real time. The power take off includes a housing that is adapted to be supported on a housing of a source of rotational energy, an input mechanism that extends through an opening provided in the housing and is adapted to be rotatably driven by the source of rotational energy whenever the source of rotational energy is operated, and an output mechanism that is rotatably driven by the input mechanism and that is adapted to be connected to a rotatably driven accessory. The controller is responsive to one or more operating conditions of the power take off for monitoring and/or controlling the operation thereof.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
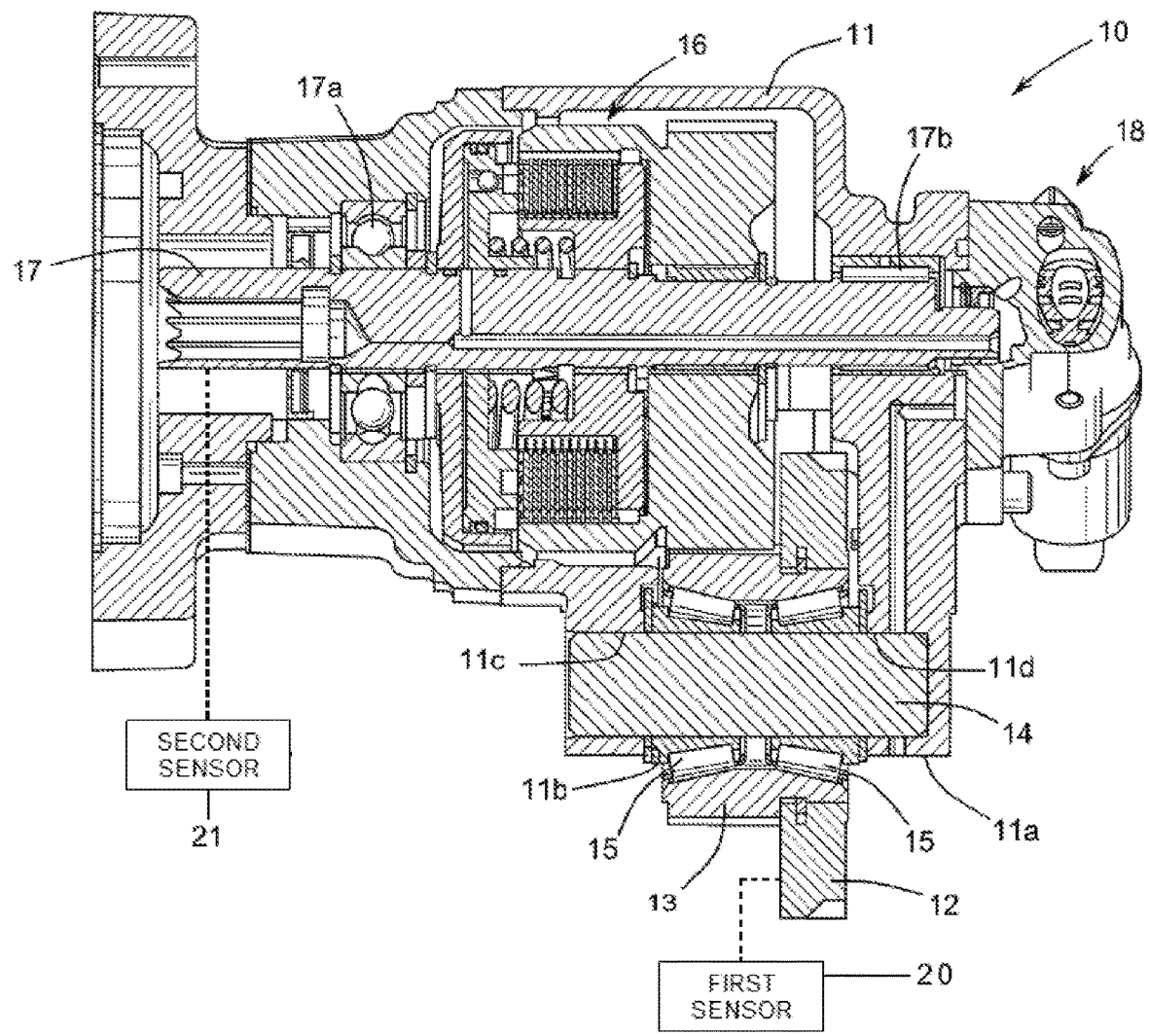
FIG. 1 is a sectional elevational view of a power take off in accordance with this invention.

Referring now to the drawings, there is illustrated in FIG. 1 a power take off, indicated generally at 10, in accordance with this invention. The illustrated power take off 10 is intended to be representative of any structure for transferring rotational energy from a source of rotational energy (not shown), such as a transmission or an engine of a vehicle, to a rotatably driven accessory (not shown), such as a hydraulic pump that is supported on the vehicle. Thus, the scope of this invention is not intended to be limited for use with the specific structure for the power take off 10 illustrated in FIG. 1. On the contrary, as will become apparent below, this invention may be used in conjunction with any desired power take off structure.

As will be explained in detail below, the power take off 10 of this invention includes a housing, an input mechanism, and an output mechanism. The power take off housing is adapted to be supported on a housing (not shown) of the source of rotational energy. The input mechanism of the power take off 10 extends through an opening provided in the power take off housing into the housing of the source of rotational energy. In this manner, the input mechanism of the power take off 10 is connected to the source of rotational energy so as to be rotatably driven whenever the source of rotational energy is operated. The output mechanism of the power take off is rotatably driven by the input mechanism and is adapted to be connected to the rotatably driven accessory (not shown). In some instances, the input mechanism of the power take off is directly connected to the output mechanism such that the driven accessory is rotatably driven whenever the source of rotational energy is operated. In other instances (such as shown in FIG. 1), a clutch assembly is provided between the input mechanism and the output mechanism such that the driven accessory is rotatably driven only when the clutch assembly is engaged while the source of rotational energy is operated.

The illustrated power take off 10 includes a hollow housing 11 having a mounting surface 11a provided thereon. An opening 11b is provided through the mounting surface 11a of the power take off housing 11. An input gear 12 is rotatably supported within the power take off housing 11 and includes a portion that extends outwardly through the opening 11b provided through the mounting surface 11a. The mounting surface 11a of the power take off housing 11 is adapted to be secured (typically by a plurality of bolts) to a corresponding mounting surface (not shown) provided on a housing (not shown) of the source of rotational energy, such as an engine or a transmission of a vehicle. As is well known in the art, the portion of the input gear 12 that extends through the opening 11b of the power take off housing 11 is adapted to extend within the housing of the source of rotational energy and engage a corresponding gear (not shown) or other mechanism provided therein. Thus, the input gear 12 of the power take off 10 is rotatably driven whenever the gear or other mechanism contained within the source of rotational energy is rotatably driven.

The illustrated input gear 12 is splined onto or otherwise supported on an input gear hub 13 for concurrent rotation. The input gear hub 13 is, in turn, rotatably supported on an input shaft 14 by a pair of roller bearings 15. First and second ends of the illustrated input shaft 14 are respectively (and non-rotatably) supported in first and second bores 11c and 11d provided in the power take off housing 11. In the illustrated embodiment, each of the input shaft 14 and the first and second bores 11c and 11d is generally cylindrical in shape, although such is not required.

The illustrated power take off 10 also includes a clutch assembly, indicated generally at 16, for selectively the connecting the input gear hub 13 to an output shaft 17 for concurrent rotation. The output shaft 17 is, in turn, adapted to be connected to the rotatably driven accessory (not shown). The illustrated output shaft 17 is rotatably supported on the power take off housing 11 by a pair of bearings 17a and 17b or other similar means. When the clutch assembly 16 is engaged, the input gear hub 13 is connected to the output shaft 17 for concurrent rotation. Thus, the rotatably driven accessory is rotatably driven by the source of rotational power when the clutch assembly 16 is engaged. Conversely, when the clutch assembly 16 is disengaged, the input gear hub 13 is disconnected from the output shaft 17. Thus, the rotatably driven accessory is not rotatably driven by the source of rotational power when the clutch assembly 16 is disengaged.

The specific structure and manner of operation of the clutch assembly 16 are conventional in the art and form no part of this invention. Thus, the clutch assembly 16 may be embodied as any desired structure for selectively the connecting the input gear hub 13 to the output shaft 17. A conventional shifter assembly, indicated generally at 18, may be provided to selectively engage and disengage the clutch assembly 16 in a known manner. If desired, the clutch assembly 16 may be omitted, and the input gear hub 13 may be constantly connected to the output shaft 17 for concurrent rotation.

The illustrated power take off 10 further includes first and second sensors 20 and 21, respectively. As shown in FIG. 1, the first sensor 20 generates a signal that is representative of the rotational speed of the input gear 12. To accomplish this, the first sensor 20 may be supported on the housing 11 of the power take off 10 at a location that is adjacent to one or more teeth provided on the input gear 12. However, the first sensor 20 may be located al any desired location and may generate a signal that is representative of any other desired characteristic of the input gear 12. As also shown in FIG. 1, the second sensor 21 generates a signal that is representative of the rotational speed of the output shaft 17. To accomplish this, the second sensor 21 may be supported on the housing 11 of the power take off 10 at a location that is adjacent to one or more splines provided on the output shaft 17. However, the second sensor 21 may be located at any desired location and may generate a signal that is representative of any other desired characteristic of the output shaft 17.

Figure 2:
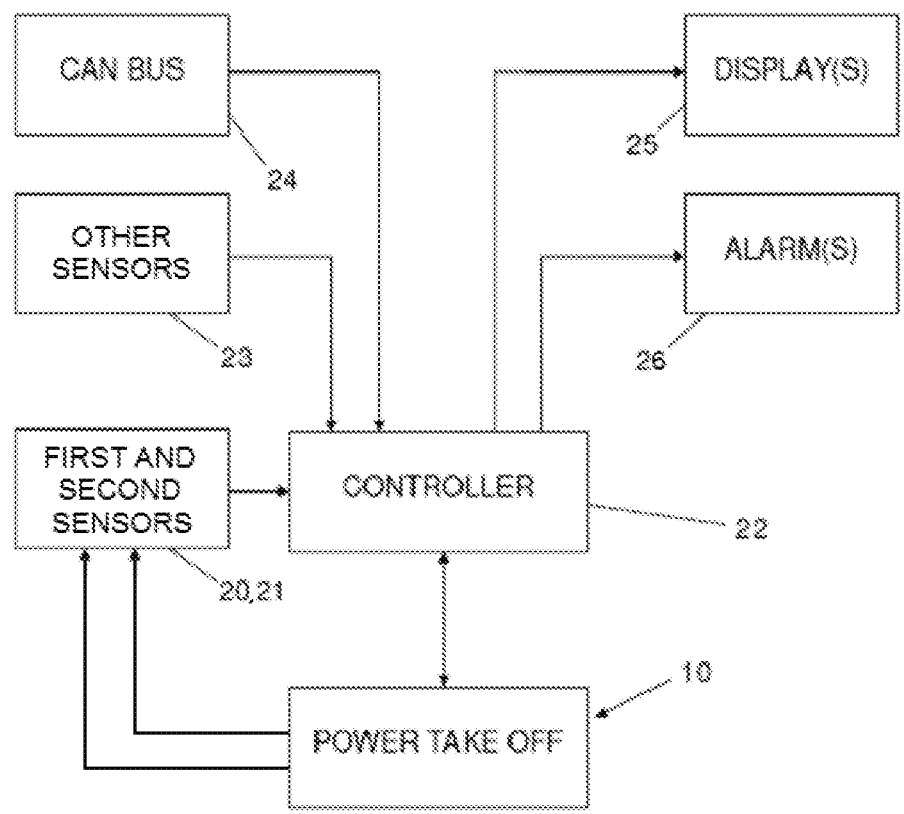
FIG. 2 is a block diagram of a configurable operational monitoring and control system for the power take off illustrated in FIG. 1.

FIG. 2 is a block diagram of a configurable operational monitoring and control system for the power take off 10 illustrated in FIG. 1. The system includes a controller 22 that may, for example, be embodied as a conventional electronic microprocessor. The controller 22 is connected to the power take off 10 so that the controller 22 and the power take off 10 can exchange electronic data therebetween, such as described further below. The controller 22 is also connected to the first and second sensors 20 and 21 so that the controller 22 can receive electronic data from the first and second sensors 20 and 21, such as also described further below.

The controller 22 may also connected to receive information from one or more other sensors 23. These other sensors 23 are, of themselves, conventional in the art and are adapted to provide signals that are representative of any other desired information that may be necessary or desirable to monitor or control the operation of the power take off 10. For example, these other sensors 23 may provide the controller 22 with information regarding the magnitude of the fluid pressure applied to the clutch 16 of the power take off 10 (if such clutch 16 is fluid-actuated), the operating status of a solenoid actuator (not shown) for the clutch 16 of the power take off 10 (if such clutch 16 is electromagnetically-actuated), and any other desired information. Also, these other sensors 23 may include one or more conventional devices (not shown) for inputting information into the controller 22, such as a keyboard, an electronic data port, and the like. Such devices allow non-operating information (such as information identifying the specific power take off 10 structure being monitored and the specific structure of engine or transmission of the vehicle on which the power take off 10 is used) to be provided directly to the controller 22.

The controller 22 may further be connected to receive information from a vehicle communications network such as, for example, a J1939 CAN (controller area network) bus 24 that is provided on a vehicle on which the power take off 10 is supported for use. As is well known, a J1939 CAN bus 24 is a vehicle bus standard that is designed to allow microcontrollers and devices to communicate with each other in applications without a host computer. The illustrated CAN bus 24 is a message-based protocol designed originally for multiplex electrical wiring within automobiles, but is also used in many other contexts. By connecting to the CAN bus 24, the controller 22 may be arranged to receive any desired information available therefrom regarding the vehicle on which the power take off 10 is supported for use. Such information may include, for example, engine speed, vehicle speed, transmission gear ratio, and any other desired information that is available from the CAN bus 24.

Generally speaking, the controller 22 receives information from some or all of the power take off 10, the first and second sensors 20 and 21, the other sensors 23, and the CAN bus 24. In response to that information, the controller 22 sends signals to the power take off 10 to control the operation thereof as deemed appropriate. The controller 22 may control the operation of the power take off 10 to optimize the operation thereof and, under certain circumstances, prevent damage from occurring thereto.

In the embodiment illustrated in FIG. 2, the controller 22 is also connected to one or more displays 25 that may be provided to facilitate the monitoring of the operation of the power take off 10 (and/or the vehicle on which the power take off 10 is used) by an operator. For example, the one or more displays 25 may display information regarding speed, torque, engine speed, transmission (and/or other) fluid pressure, number (and/or duration) of clutch engagements within the power take off 10, and the like.

In the illustrated embodiment, the controller 22 is further connected to one or more alarms 26 that may be provided to affirmatively alert an operator of the occurrence of a predetermined event. For example, the one or more alarms 26 may provide a visible, audible, or other indication when the predetermined event has occurred. The controller 22 may also be configured to troubleshoot the nature of the predetermined event and automatically remedy same or, if not possible, control the operation of the power take off 10 in such a manner as to avoid damage.

Figure 3:
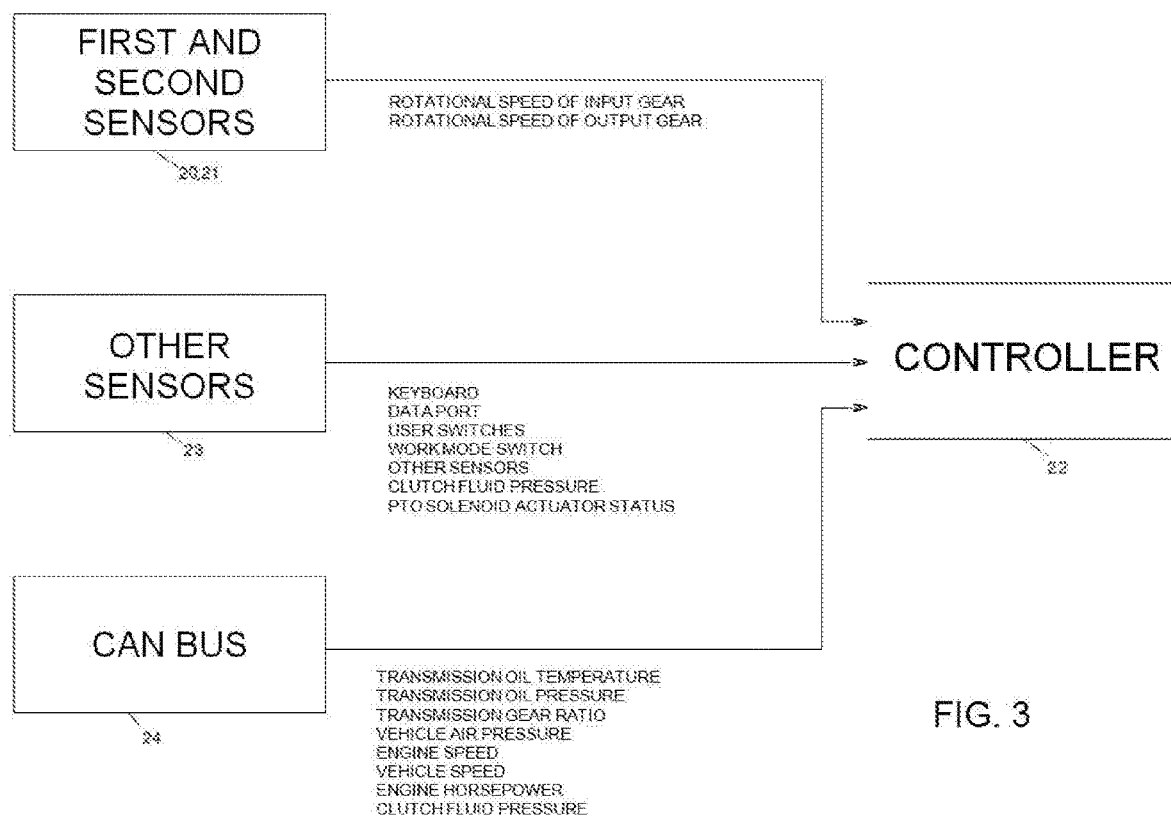
FIG. 3 is a more detailed block diagram showing the inputs to the controller of the configurable operational monitoring and control system illustrated in FIG. 2.

FIG. 3 is a more detailed block diagram showing representative inputs to the controller 22 of the configurable operational monitoring and control system illustrated in FIG. 2. As shown therein, the inputs to the controller 22 provided from the first and second sensors 20 and 21 can include the rotational speed of the input gear 12 and the rotational speed of the output shaft 17, respectively. The inputs to the controller 22 provided from the other sensors 23 can include keyboards, data ports, user switches, work mode switches, clutch fluid pressure sensors, solenoid actuator status sensors, and other sensors. Lastly, the inputs to the controller 22 provided from the CAN bus 24 can include transmission oil temperature, transmission oil pressure, transmission gear ratio, vehicle air pressure, engine speed, vehicle speed, engine horsepower, vehicle clutch fluid level and pressure, and others.

The controller 22 of the configurable operational monitoring and control system illustrated in FIGS. 2 and 3 can be programmed to perform a variety of functions. For example, the controller 22 can be programmed to compare the rotational speeds of the input gear 12 and the output shaft 17. If the rotational speeds of the input gear 12 and the output shaft 17 differ by more than a predetermined amount (after taking into account any gear ratio therebetween that may be provided within the power take off 10), then the controller 22 can indicate that a problem has occurred by means of the display 25 or the alarm 26. This can be accomplished either in a power take off 10 having a clutch 16 when the clutch 16 is engaged or in a power take off 10 having no clutch 16.

Similarly, in a power take off 10 having a clutch 16, the controller 22 can indicate that a problem has occurred when the rotational speed of the output shaft 17 is more than a predetermined amount when the clutch 16 is disengaged (which is a situation where the output shaft 17 would not normally be rotating at all). Another abnormal situation that can be detected is when the clutch 16 is engaged, the power take off 10 is turning under load, and the internal gear ratio relationship between the input gear 12 and the output shaft 17 changes, which can indicate slippage or other problem with the clutch 16. The controller 22 can be programmed with one or more troubleshooting algorithms, which can be used to not only alert an operator, but also isolate the problem and potentially resolve it automatically.

As mentioned above, the power take off 10 may be used to transfer rotational energy to a driven accessory, such as a hydraulic pump that is supported on the vehicle. In such an instance, information regarding the operation of the hydraulic pump may be provided to the controller 22 from one or more of the other sensors 23 or from the CAN bus 24. For example, if the clutch 16 of the power take off 10 is engaged, the output shaft 17 is rotating, and the internal gear ratio within the power take off 10 is correct, but there is no flow of fluid from the pump, then there may be a problem with the operation of the hydraulic pump. This can be quite helpful because a lack of fluid flow from the pump may be the result of a problem within the pump itself or a problem with the power take off 10 driving the pump. Alternatively, if the flow of fluid from the pump is incorrect when the clutch 16 of the power take off is engaged and the output shaft is turning, but the internal power take off ratio relationship is not correct or fluctuating, then there may be a problem with the operation of the power take off (such as slippage of the clutch 16). If the flow of fluid from the pump is incorrect when the clutch 16 of the power take off is engaged but the output shaft is not turning, then there may be a problem with the operation of the power take off (such as a lack of hydraulic pressure to engage the clutch 16).

Thus, the controller 22 of this invention not only controls the functions of the power take off 10, but also combines inputs from a variety of sources to monitor the current operational status of the power take off 10 and its associated components. This can all be done in real time, which is a significant advantage. The protections provided by this controller 22 may, for example, include protection from equipment abuse, as well as preventing operation if predetermined parameters are not met. Information and troubleshooting may additionally be displayed on the display 25 or generated by the alarm 26 for use by an operator.

The advantage of this controller 22 over known controllers is that it combines specific information available on the vehicle CAN bus 23, sensor information from the power take off 10, and customer input data with custom algorithms to monitor the status of the power take off 10 and display it to the operator in real time. This system can be expandable to incorporate additional sensors for additional monitoring as the need arises. The controller 22 may also be able to detect faults in the system, alert the operator, and provide simple troubleshooting recommendations regarding the fault. Such faults may include, but are not limited to, over-speed condition, over-torque condition, excessive wheel speed, and insufficient hydraulic or pneumatic pressure to operate the clutches (which might cause clutch burn-up).

The principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly comprising:
   a power take off including a housing that is adapted to be supported on a housing of a source of rotational energy, an input mechanism that extends through an opening provided in the housing and is adapted to engage and be rotatably driven by the source of rotational energy whenever the source of rotational energy is operated, an output mechanism that is adapted to rotatably drive a rotatably driven accessory, and a clutch that can be selectively engaged to cause the input mechanism to rotatably drive the output mechanism and disengaged to cause the input mechanism to not rotatably drive the output mechanism;
   a first sensor that generates a signal that is representative of a rotational speed of the input mechanism;
   a second sensor that generates a signal that is representative of a rotational speed of the output mechanism; and
   a controller that is responsive to the signals from the first sensor and the second sensor for generating an indication that a problem has occurred when either:
   (1) the rotational speeds of the input mechanism and the output mechanism differ by more than a predetermined amount when the clutch is engaged;
   (2) the rotational speed of the output mechanism is more than a predetermined amount when the clutch is disengaged;
   (3) the rotational speeds of the input mechanism and the output mechanism change by more than a predetermined amount when the clutch is engaged; or
   (4) the output mechanism is not rotating when the clutch is engaged.

2. The assembly defined in claim 1 wherein the controller generates the indication that the problem has occurred when the rotational speeds of the input mechanism and the output mechanism differ by more than a predetermined amount when the clutch is engaged.

3. The assembly defined in claim 1 wherein the controller generates the indication that the problem has occurred when the rotational speed of the output mechanism is more than a predetermined amount when the clutch is disengaged.

4. The assembly defined in claim 1 wherein the controller generates the indication that the problem has occurred when the rotational speeds of the input mechanism and the output mechanism change by more than a predetermined amount when the clutch is engaged.

5. The assembly defined in claim 1 wherein the controller generates the indication that the problem has occurred when the output mechanism is not rotating when the clutch is engaged.

6. An assembly comprising:
   a pump that, when operating properly, generates a flow of fluid when rotatably driven;
   a power take off including a housing that is adapted to be supported on a housing of a source of rotational energy, an input mechanism that extends through an opening provided in the housing and is adapted to engage and be rotatably driven by the source of rotational energy whenever the source of rotational energy is operated, an output mechanism that rotatably drives the hydraulic pump, and a clutch that can be selectively engaged to cause the input mechanism to rotatably drive the output mechanism and disengaged to cause the input mechanism to not rotatably drive the output mechanism;
   a first sensor that generates a signal that is representative of a rotational speed of the input mechanism;
   a second sensor that generates a signal that is representative of a rotational speed of the output mechanism;
   a third sensor that generates a signal that is representative of the flow of fluid generated by the pump; and
   a controller that is responsive to the signals from the first, second, and third sensors for generating an indication that a problem has occurred when either:
   (1) the rotational speeds of the input mechanism and the output mechanism differ by more than a predetermined amount when the clutch is engaged;
   (2) the rotational speed of the output mechanism is more than a predetermined amount when the clutch is disengaged;
   (3) the rotational speeds of the input mechanism and the output mechanism change by more than a predetermined amount when the clutch is engaged; or
   (4) the output mechanism is not rotating when the clutch is engaged.

7. The assembly defined in claim 6 wherein the controller generates the indication that the problem has occurred when the rotational speeds of the input mechanism and the output mechanism differ by more than a predetermined amount when the clutch is engaged.

8. The assembly defined in claim 6 wherein the controller generates the indication that the problem has occurred when the rotational speed of the output mechanism is more than a predetermined amount when the clutch is disengaged.

9. The assembly defined in claim 6 wherein the controller generates the indication that the problem has occurred when the rotational speeds of the input mechanism and the output mechanism change by more than a predetermined amount when the clutch is engaged.

10. The assembly defined in claim 6 wherein the controller generates the indication that the problem has occurred when the output mechanism is not rotating when the clutch is engaged.

* * * * *